UNITED STATES PATENT OFFICE 2,042,122

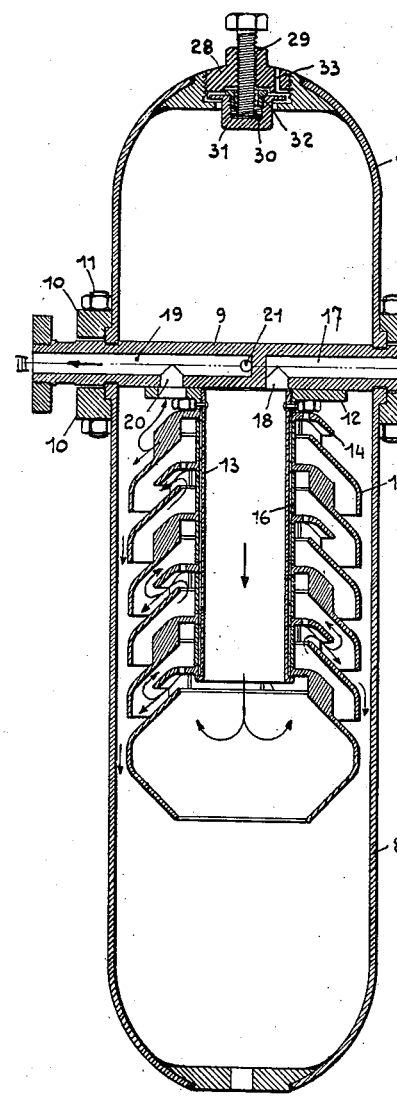
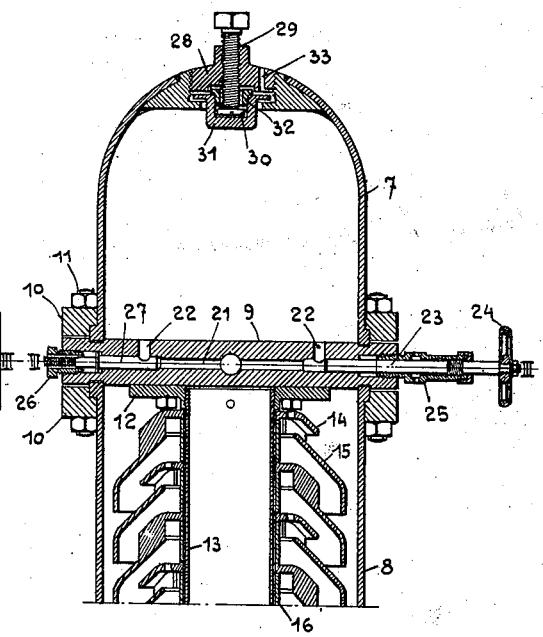
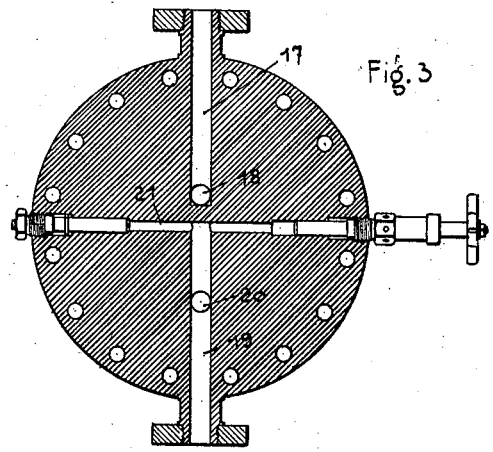

SYSTEM FOR THE PREVENTION OF SCALE FORMATION AND FOR THE CONTINUOUS AUTOMATIC DISCHARGE OF MUD FROM STEAM BOILERS AND HEATERS OF LIQUIDS

Cesare Piccardo, Genoa, Italy

Application May 11, 1934, Serial No. 725,150
In Austria November 28, 1933

7 Claims. (Cl. 210—39)

The invention refers to a system for the prevention of scale and the continuous automatic removal of mud from steam boilers and heaters of liquid of the kind in which in a boiler water circulation outside the boiler, produced by gravity or drop of temperature, a purifier consisting in a mud separator provided with reagent supplying means is inserted.

The main object of the invention is to provide an improved construction of a purifier of the kind specified in my Patent No. 1,774,211 adapted for the combined purpose to remove the mud from the circulating boiler water and to add to this water in a continuous controllable manner the required amount of reagent in order to promote within the boiler the reactions for preventing the scale formation, by transforming the scale forming salts in muddy non agglomerative precipitates.

Other objects of the invention are to provide a purifier equipment of the kind outlined which as a boiler accessory presents constructive features corresponding in a higher degree to the practical requirements of a pressure receptacle, to provide a more reliable and efficient system for adding to the circulating water the reagent for precipitating the hardness forming salts in a controllable manner up to the smallest quantities, to provide further that the reagent is entrained by the circulating boiler water after such water has been cleaned or free from mud, to provide frustums of cones or mud separating means which enable a higher efficiency of the equipment with respect to the former Piccardo equipment of the same volume, and to provide means preventing the muddy boiler water to take its ascending path in the purifier along the shell and to oblige it to take its path along the zigzag like passage in the central part of the purifier.

Other objects and advantages will be apparent from the following specification.

For this purpose the purifier according to my said former Patent No. 1,774,211 has undergone the following modifications:

1. The body of the purifier has been combined with the reagent storing and distributing chamber, that forms the upper part of the separator proper instead of being constituted of a separate receptacle connected to the mud separator by means of a pipe connection. The reagent storing chamber is separated from the mud separator by means of a central disk or diaphragm containing pipe connections for the attachment of the circulation conduits and the ports for causing the reagent to be entrained from the reagent storing room by the circulating boiler water in a quantity which can be controlled by a hand operated control valve also arranged on the diaphragm.

2. The arrangement of the communication ports between the reagent storing chamber and the circulation piping so as to cause the reagent to be introduced into the clean water, i. e. in the water having traversed the mud separator and just before the same leaves the purifier for returning in the boiler. In this manner the boiler water penetrating into the reagent storing chamber is clean water and mud accumulation within said chamber as well as reagent losses are avoided.

3. The frustums of cones of my former patent have been modified in their shape by the addition to their outer edges of a substantially cylindrical flange, so that the new cones are bell-like shaped, with the exception of the lowest one that is shaped as two frustums of cones connected by their base. This permits of a more efficient working of the device, which can be more compact in construction, and therefore of reduced volume by parity of purifying efficiency. The construction of the lowest double cone compels muddy circulating water to take its way along the shell of the receptacle instead of along the zigzag like passage in the center of it.

4. The arrangement of the reagent distributing conduits within the diaphragm so as to render it possible to fit the reagent control valve on either of two diametrically opposite sides of the separator, so as to permit of fitting the valve always at the front side of the purifier and to facilitate the erection of the equipment.

Other modifications of minor importance will become evident from the following specification by reference to the accompanying drawing, in which:

Figure 1 is a sectional middle view of the improved purifier construction;

Figure 2 is a partial sectional middle view at right angles to Figure 1.

Figure 3 is a sectional view on line III—III of Figures 1 and 2.

In the drawing in which like parts have been referred to by like characters, 1 is the boiler, 2 the separator or purifier of muddy water, 3 the ascending heated pipe of the water circulation including the purifier and 4 is the descending or return pipe of this circulation.

The improved purifier as shown in the drawing is composed of a pair of cylindrical vessels 7 and 8 each closed at one end by an oval bottom and connected by their open ends to either side of a central disk 9, where they are kept in position with a tight fit by means of a pair of annular movable jaws 10 kept together and against short edge flanges of the said two cylindrical shells by means of bolts 11, thus holding these flanges against the central disk 9.

Axially secured to the central disk 9 by means of a flange 12 is a vertical descending pipe 13 upon which are arranged a number of superposed composed frustums of cones made of cast iron, each comprising a small cone 14 upwardly closed by an annular horizontal wall and adhering against the descending tube 13 and a larger bell-like cone 15 open at the top.

The lower composite cone rests on a circular edge of the descending tube 13 and the corresponding larger cone presents the shape of a double frustum of cone. The superposed frustums of cones are kept apart by bushings 16. 17 is a radial bore in the disk 9 connected to the inlet branch of the circulation piping and leading through port 18 into the descending tube 13; 19 is a radial bore of disk 9 leading to the outlet port 20 connected to the return piping of the purified water.

At right angles to bores 17, 19 the central disk presents the bore 21 communicating by vertical ports 22 with the reagent storing chamber. One end of the bore is provided with a reagent regulating and intercepting valve consisting of a cylindrical threaded stem 23 with handwheel 24 and stuffing box 25 screwed into the central disk 9. The opposite end of the bore 21 is closed by a stuffing box 26 with axial threaded plug 27, which closing means however may be readily replaced by a valve which may serve as a substitute for the valve at the other end. The possibility to arrange the reagent intercepting and regulating valve at either ends renders it possible to have said valve always at the front of the apparatus.

By operating this valve the circulation water is allowed to ascend in a regulated quantity through bore 22 in the reagent storing chamber and to displace from it a corresponding quantity of concentrated solution of reagent, as sodium carbonate, which solution being heavier than the circulating hot water descends through port 22 in said water and is conveyed into the boiler.

The top of the reagent storing vessel is provided with closing means for charging this vessel with reagent, 28 is a threaded plug traversed by a screw 29 carrying a collar 30 connected with valve 31 by means of the nut 32. 33 is a vent hole permitting of steam under pressure escaping from the vessel when this should be refilled, as soon as screw 29 is slightly loosened.

The muddy boiler water circulates in the direction of the arrows. The same enters through bore 17 in the descending tube 13 where on account of the large section of this latter a slowing down of the initial speed of the water circulation is attained. This speed is further reduced after the circulating boiler water has left the lower end of the descending central tube when it reverses its direction and takes a zigzag like ascending path in the central part of the vessel to leave the apparatus at the top, entraining with it a predeterminated amount of reagent, as sodium carbonate, as established by the regulation of the soda control valve.

On account of the inversion of the current at the lower end of the descending tube a first separation of the heavier particles of mud towards the bottom of the apparatus takes place. The lighter particles following the ascending current are gradually separated on account of the successive deviations from this current and are directed radially through the quiescent zones between the larger cones into the annular space along the shell of the vessel. From this annular space the mud assisted by the descending motion of the water cooled by contact with the shell is easily collected on the bottom of the apparatus.

The totality of the precipitates is discharged from time to time as a dense slurry from the bottom of the purifier.

I claim:

1. For use in an equipment for the prevention of scale and the continuous automatic discharge of mud from steam boilers and heaters of liquids, a purifier comprising an upper reagent storing and distributing chamber and a lower mud separator fitted the one in continuation to the other so as to form together a single cylindrical body separated into the said two chambers by a diaphragm, an inlet pipe communication leading from the exterior of said purifier through the said diaphragm into the lower chamber near the center thereof, a descending tube opened at the bottom end leading from the center of the diaphragm and ending near the bottom end thereof, two coaxial groups of bell-like members on the said central descending tube arranged with respect to each other so as to provide in the central part an annular zigzag like passage for the ascending fluid fed through the upper end of the descending tube, exterior conduits leading from the upper reagent storing chamber of the purifier into the said outlet pipe of the separator and a conduit leading from the position of said diaphragm situated outwardly from the central descending tube to the exterior conduits.

2. An equipment according to claim 1, in which the lower bell-like member has the form of two frustums of cones connected together by their larger base.

3. An equipment according to claim 1, wherein the conduit leading from the upper reagent storing chamber into the outlet pipe of the separator has two inlet ports situated at diametrically opposite points of the diaphragm, one of these ports being closed by a plug and the other being controlled in a regulatable manner by a valve.

4. For use in an equipment for the prevention of scale and the continuous automatic discharge of mud from steam boilers and heaters of liquids, a purifier comprising an upper reagent storing and distributing chamber and a lower mud separating chamber fitted the one in continuation to the other so as to form together a single cylindrical body separated into the said chambers by a central disk or diaphragm, an inlet pipe attachment to be connected with the boiler communicating from the exterior of said purifier through a radial inlet port within the diaphragm with the lower chamber at the center thereof, a descending tube axially secured to the diaphragm within the lower chamber, two coaxial groups of bell-like members on the said central descending tube so arranged with respect to each other as to provide in the central part an annular zigzag like passage for the ascending fluid, a conduit leading from a position of said diaphragm situated outwardly of the central descending tube and through a radial outlet port within the diaphragm to an attachment to be connected with the boiler, a through passing diametrical bore within the diaphragm traversing the radial outlet port, conduits leading from the upper reagent storing chamber into the said bore and hand controlled valve rod of a reagent control valve projecting from the one or the other end of such through passing bore to control the passage of ascending circulating water through the conduit and the displacement of a corresponding quantity of reagent to be entrained in the boiler and a valve rod with an intercepting stop closing the end of the through passage bore not occupied by the reagent control valve.

5. A purifier comprising an upper reagent chamber, a lower separating chamber, a diaphragm dividing the chambers and to which diaphragm the chambers are connected, a descending tube arranged in the separating chamber, mechanical separating means carried by the tube within the separating chamber, inlet and outlet passages for the boiler water formed in the diaphragm, the inlet passage communicating with the tube, the outlet passage communicating with the separating chamber exteriorly of the tube, a channel formed in the diaphragm having communication with the outlet passage and with the reagent chamber, and a valve for controlling communication between said channel and the reagent chamber.

6. A purifier of the class described, including an upper reagent chamber, a lower separating chamber, a diaphragm arranged between the chambers, means carried by the diaphragm for connecting the chambers and diaphragm as a unit, a tube carried by the diaphragm and depending within the separating chamber, mechanical separating means within the separating chamber and carried by the exterior of the tube, the diaphragm being formed with diametrically opposite passages, one forming the inlet for the water from the boiler being in communication with the tube, the other forming the outlet from the purifier and communicating with the separating chamber beyond the tube, said diaphragm being further formed with a channel in open communication with the outlet passage and in communication with the reagent chamber, and a valve operative from beyond the diaphragm for controlling communication between the reagent chamber and the outlet passage.

7. A purifier of the class described, including an upper reagent chamber, a lower separating chamber, a diaphragm connecting the chambers and forming a division between them, said diaphragm being formed with diametrically opposed passages, one forming the inlet for the water from the boiler and the other forming an outlet from the purifier, a tube carried by the diaphragm and depending within the separating chamber, means carried by the exterior of the tube to compel water delivered from the bottom of the tube to follow a tortuous rising path in the separating chamber beyond the tube, a communication between the space of the separating chamber beyond the tube and the outlet passage, and a channel in the diaphragm having end communication with the outlet passage and closed against the inlet passage, said channel having valved communication with the reagent chamber.

CESARE PICCARDO.